United States Patent
Haran et al.

(10) Patent No.: US 8,320,762 B2
(45) Date of Patent: Nov. 27, 2012

(54) METHODS AND SYSTEMS FOR BANDWIDTHS DOUBLING IN AN ETHERNET PASSIVE OPTICAL NETWORK

(75) Inventors: Onn Haran, Even Yehuda (IL); Ariel Maislos, Sunnyvale, CA (US)

(73) Assignee: PMC Sierra Ltd, Herzeliya Pituach (IL)

( * ) Notice: Subject to any disclaimer, the term of this patent is extended or adjusted under 35 U.S.C. 154(b) by 2 days.

(21) Appl. No.: 12/830,330

(22) Filed: Jul. 4, 2010

(65) Prior Publication Data

US 2010/0272440 A1 Oct. 28, 2010

Related U.S. Application Data

(63) Continuation of application No. 11/573,893, filed as application No. PCT/IL2005/001061 on Oct. 2, 2005, now Pat. No. 7,778,545.

(60) Provisional application No. 60/705,182, filed on Aug. 4, 2005, provisional application No. 60/623,880, filed on Nov. 2, 2004.

(51) Int. Cl.
*H04B 10/20* (2006.01)
*H04J 14/00* (2006.01)

(52) U.S. Cl. .................. 398/67; 398/58; 398/72
(58) Field of Classification Search .................. 398/58, 398/67, 70–72
See application file for complete search history.

(56) References Cited

U.S. PATENT DOCUMENTS

| | | | |
|---|---|---|---|
| 5,786,917 A * | 7/1998 | Maeno | 398/51 |
| 6,625,241 B2 * | 9/2003 | Mejia | 375/372 |
| 6,832,046 B1 * | 12/2004 | Thomas | 398/72 |
| 6,967,949 B2 | 11/2005 | Davis et al. | |
| 7,095,737 B2 | 8/2006 | Lo | |
| 7,106,967 B2 * | 9/2006 | Handelman | 398/47 |
| 7,301,968 B2 | 11/2007 | Haran | |
| 2003/0137975 A1 * | 7/2003 | Song et al. | 370/353 |
| 2005/0019033 A1 * | 1/2005 | Oh et al. | 398/58 |

* cited by examiner

*Primary Examiner* — Nathan Curs
(74) *Attorney, Agent, or Firm* — Mark M Friedman

(57) ABSTRACT

Systems and methods for bandwidth doubling in an Ethernet passive optical network (EPON) enable an optical line terminal (OLT) to transmit downlink to at least one double rate optical network unit (ONU). The double rate transmission is preferably facilitated by use of single rate devices (OLT and ONU) functionally connected to provide the double rate capability. The methods include packet-by-packet multiplexing, bit-by-bit line code interleaving, doubling an inter-packet gap (IPG) length, defining windows of transmission for different transmission rates, using the 8B/10B code, removing the 8B/10B code from just the downlink transmission and symbol-by-symbol multiplexing is downlink transmissions from the double rate OLT.

9 Claims, 6 Drawing Sheets

| Field name | Usage |
|---|---|
| Delay[10:0] | The delay the packet suffered from original start to start at double speed – the delay is measured at 2 bytes unit. Since the maximal delay is 1.5 the maximal packet size, the value of 0-2.25KB is required |
| Channel number | Indication of original channel |
| Error correction[3:0] | CRC4 polynomial |

METHODS AND SYSTEMS FOR BANDWIDTHS DOUBLING IN AN ETHERNET PASSIVE OPTICAL NETWORK

RELATED APPLICATIONS

This in a Continuation of U.S. Pat. No. 11/573,893 filed Feb. 18, 2007, which is a National Stage of PCT/IL2005/001061, filed Oct. 2, 2005, which claims nor it of U.S. Provisional Patent Application No. 60/705,182 filed Aug. 4, 2005 and U.S. Provisional Patent Application No. 60/623,880 filed Nov. 2, 2004, the contents of which are incorporated herein by reference.

FIELD OF THE INVENTION

The present invention relates generally to passive optical networks (PON), and more particularly to methods and system for increasing downlink transmission rates in Ethernet passive optical networks (EPON).

BACKGROUND OF THE INVENTION

Ethernet passive optical networks are known, as described for example in US Patent Application No. 20020196801 to Haran et al. In general, as shown in FIG. 1, an EPON 100 comprises an optical link terminal (OLT) 102 connected through a splitter 104 to a plurality (in this case 3) of optical network units (ONUs) 106, 108 and 110. The OLT transmits downlink transmissions to each ONU. Each ONU transmits uplink transmissions to the OLT. In a "unified" EPON, all devices transmit at the same rate, for example currently at 1 Gigabit per second (1G).

The new IEEE 802.3 EPON standard specifies a 1G access network shared between multiple users. The current definition of the uplink/downlink channels is symmetric. Looking forward, the existing bandwidth (BW) might not be sufficient when customer BW requirements will increase, for example when Internet protocol (IP) high-definition television (HDTV) services become popular.

A time-dependent channel is a communication channel in which the data arrival time plays as important a role as the data content itself. Examples for such channels are:
 Control messages with embedded timestamps, as in IEEE802.3 EPON
 A channel with encryption based on packet transmission time, as commonly implemented in EPON solutions Doubling of a downlink channel (path) BW can be performed simply by time division multiplexing (TDM), as well known in the art. In this case, two independent channels are used, placing on the transmission line information from one channel followed by information from the other channel, based on a selected scheme. The problem with this type of solution is that the line code appears as two normal rate (1G) links, not one double rate (2G) link.

It would therefore be advantageous to have mechanisms required for higher rate downlink transmission support in EPON. In particular, it would be advantageous to have a 2G downlink BW in EPON. It would be further advantageous that these mechanisms retain maximal similarity to the existing 1G solution, thereby allowing fast time-to-market.

SUMMARY OF THE INVENTION

The present invention discloses methods and systems for doubling an EPON downlink transmission to rates up to 2G from the existing 1G ("dual-rate operation" of 1G and 2G). The speed-up is achieved in various ways, e.g. by providing a line coding in which symbols are run twice faster than in existing coding, or by bit interleaving with a bit alignment to 20 bits. In addition, the present invention provides an ability to add delay information to a packet preamble, thereby achieving a solution that can use two existing 1G components for creating the 2G link.

According to the present invention there is provided a method for bandwidth doubling in an EPON comprising the steps of providing a mixed system in which a logical OLT is optically coupled to at least one single rate ONU and to at least one double rate ONU, wherein the OLT is operative to transmit downstream packets through a downlink to each ONU, and wherein each ONU is operative to transmit upstream packets through an uplink to the OLT; and enabling the OLT to transmit to each ONU at a downstream rate that matches the respective ONU rate.

According to one feature of the method of the present invention, the step of providing a mixed system in which a logical OLT is optically coupled to at least one single rate ONU and to at least one double rate ONU includes providing a mixed system in which each single rate ONU is a 1G ONU and each double rate ONU is a 2G ONU operative to perform combined 1G and 2G operations.

According to another feature of the method of the present invention, the step of providing a mixed system in which a logical OLT is optically coupled to at least one single rate ONU and to at least one double rate ONU includes providing a mixed system in which the logical OLT is a 2G OLT that comprises a functional combination of two 1G OLT devices and is operative to transmit to each 2G ONU at a 2G rate.

According to the present invention, in a first embodiment of the method, the step of enabling the 2G OLT to transmit to each 2G ONU at a 2G rate includes packet-by-packet multiplexing of packets from the two 1G OLT devices, and outputting a 2G downstream traffic output in a 2G channel.

According to the present invention, in a second embodiment of the method, the step of enabling the 2G OLT to transmit to each 2G ONU at a 2G rate includes line code interleaving two different 1G links into a single 2G downlink.

According to the present invention, a particular feature of the line code interleaving includes bit-by-bit interleaving of two different bytes starting with the least significant bit (LSB) of each byte; and spacing the two different bytes with a separation of a byte therebetween in a transmission stream.

According to the present invention, in a third embodiment of the method, the step of enabling the 2G OLT to transmit to each 2G ONU at a 2G rate includes doubling an inter-packet gap (IPG) length in the downlink transmission of packets to each double rate ONU, whereby the doubling of the IPG guarantees comma synchronization.

According to the present invention, in a fourth embodiment of the method, the step of enabling the 2G OLT to transmit to each 2G ONU at a 2G rate includes defining transmission windows, each window transmission occurring at a defined rate.

According to the present invention, a particular feature of the defining of transmission windows that transmit at a defined rate includes performing reordering of the downlink transmission by placing each packet in a respective queue according to a required transmission rate in an ingress process, selecting a group of queues for transmission in an egress process, and transmitting the packets in each queue according to results of the selection.

According to the present invention, in a fifth embodiment of the method, the step of enabling the 2G OLT to transmit to each 2G ONU at a 2G rate includes configuring the OLT to transmit to each 2G ONU at a 2G rate using a 8 B/10 B line code.

According to the present invention, in a sixth embodiment of the method, the step of enabling the 2G OLT to transmit to each 2G ONU at a 2G rate includes removing a 8 B/10 B code from the downstream transmission.

According to the present invention, in a seventh embodiment of the method, the step of enabling the 2G OLT to transmit to each 2G ONU at a 2G rate includes symbol-by-symbol multiplexing.

According to the present invention there is provided a method for bandwidth doubling in an EPON comprising the steps of providing a mixed system in which an OLT is optically coupled to at least one 1G ONU and to at least one 2G ONU, wherein the OLT is operative to transmit downstream packets through a downlink to each ONU, and wherein each ONU is operative to transmit upstream packets through an uplink to the OLT and configuring the OLT to transmit to each 2G ONU at a 2G rate.

According to the present invention there is provided a method for bandwidth doubling in an EPON comprising the steps of providing a mixed system in which an OLT is optically coupled to at least one 1G ONU and to at least one 2G ONU, wherein the OLT is operative to transmit downstream packets through a downlink to each ONU, and wherein each ONU is operative to transmit upstream packets through an uplink to a respective OLT; and by the OLT, performing packet-by-packet multiplexing of packets and outputting a 2G downstream traffic output in a 2G channel.

According to the present invention there is provided a method for bandwidth doubling in an EPON comprising the steps of providing a mixed system in which an OLT is optically coupled to at least one 1G ONU and to at least one 2G ONU, wherein the OLT is operative to transmit downstream packets through a downlink to each ONU, and wherein each ONU is operative to transmit upstream packets through an uplink to the OLT, and, by the OLT, line code interleaving two different 1G links into a single 2G downlink.

According to the present invention there is provided a method for bandwidth doubling in an EPON comprising the steps of providing a mixed system in which an OLT is optically coupled to at least one 1G ONU and to at least one 2G ONU, wherein the OLT is operative to transmit downstream packets through a downlink to each ONU, and wherein each ONU is operative to transmit upstream packets through an uplink to the OLT, and, by the OLT, doubling an inter-packet gap (IPG) length in the downlink transmission of packets to each double rate ONU, whereby the doubling of the IPG guarantees comma synchronization at the 1G rate before the downlink transmission to each 1G ONU.

According to the present invention there is provided a method for bandwidth doubling in an EPON comprising the steps of providing a mixed system in which an OLT is optically coupled to at least one 1G ONU and to at least one 2G ONU, wherein the OLT is operative to transmit downstream packets through a downlink to each ONU, and wherein each ONU is operative to transmit upstream packets through an uplink to the OLT, and, by the OLT, defining transmission windows, wherein each window's transmission occurs at a defined rate selected from the group consisting of a 1G rate and a 2G rate.

According to the present invention there is provided a system for effecting bandwidth doubling in an EPON that comprises a logical OLT optically coupled to a plurality of ONUs, the system comprising a mechanism for doubling the downlink transmission rate from each OLT to at least one ONU configured to receive double rate transmissions.

According to one feature in the system for effecting bandwidth doubling in an EPON of the present invention, the mechanism for doubling the downlink transmission rate from each OLT to at least one ONU comprises a subsystem comprising two single rate OLT devices functionally connected through a complex programmable logic device to provide a double rate transmission functionality to the logical OLT.

According to another feature in the system for effecting bandwidth doubling in an EPON of the present invention, the single rate is a 1G rate and the double rate is a 2G rate.

According to yet another feature in the system for effecting bandwidth doubling in an EPON of the present invention, the at least one ONU configured to receive double rate transmissions is a 2G ONU that comprises two 1G ONU devices functionally connected to receive 2G downlink transmissions.

BRIEF DESCRIPTION OF THE DRAWINGS

For a better understanding of the present invention and to show more clearly how it could be applied, reference will now be made, by way of example only, to the accompanying drawings in which.

DETAILED DESCRIPTION OF THE PREFERRED EMBODIMENTS

The present invention discloses a "mixed" EPON system that comprises mixed end devices, some supporting a basic operating rate and some supporting a higher operating rate in the downlink between an OLT and each ONU. A mixed EPON requires the higher (e.g. double) rate to be a multiplicity of the basic clock rate. Such a multiplicity is also required in the uplink rate, which is derived from the downlink rate. If the higher rate is not a multiplicity of the basic clock rate, excess jitter will be created in the transmissions.

A higher rate EPON may be "asymmetric" when only the downlink rate is increased, or "symmetric" when both the uplink and downlink rates are increased. One way to implement a higher rate EPON is to use a 10G solution, as expected in the next stage of EPON technology. More preferably, the present invention discloses an asymmetric solution that uses a proprietary 2G rate. This "2G solution" can use some existing 2.5G SONET components, which translates to 2G Ethernet after the 8 b/10 B line code. Thus, in a particular case of asymmetric EPON, described in detail herein, the uplink rate is 1G and the downlink rate is 1G or 2G.

Figure 1:
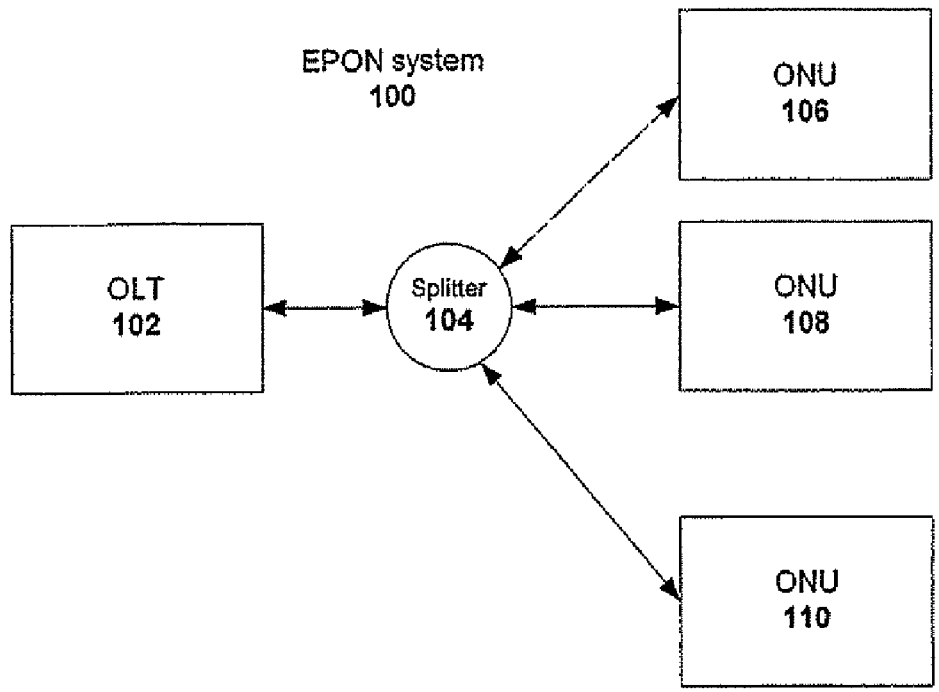
FIG. 1 shows schematically an EPON.

With reference to a higher rate EPON of the present invention, exemplarily in FIG. 1, OLT 102 is operative to transmit at a double downlink rate (2G ). While in every EPON there is only one logical OLT, the present invention discloses a logical 2G OLT achieved through a functional combination of two "normal" or legacy 1G OLT "devices". Hereinafter, a logical 2G OLT of the present invention will be simply referred to as a "double rate" or 2G OLT. In the higher rate EPON of the present invention, some of the ONUs (exemplarily 106 and 108) may operate at the normal 1G rate (i.e. be "1G devices") while other ONUs (exemplarily 110) may operate at both normal and higher (2G) rates, in which case they are called "2G devices". Each ONU has a corresponding receiver operative to receive transmissions at the respective rate (not shown). A 1G ONU includes a 1G receiver and a 2G ONU includes both a 1G receiver and a 2G receiver, as it can work both at the basic rate and at the double rate. Similar to the 2G functionality of a 2G OLT, the 2G functionality of a 2G ONU may be achieved by using two 1G ONU devices.

It is to be understood that while the 2G OLT and ONUs of the present invention are described as a functional combination of legacy 1G devices, the various methods disclosed herein can be equally well implemented in dedicated 2G devices. Such dedicated 2G OLT and ONUs preferably include all the required functionalities to effect the implementation of the methods.

Figure 2:
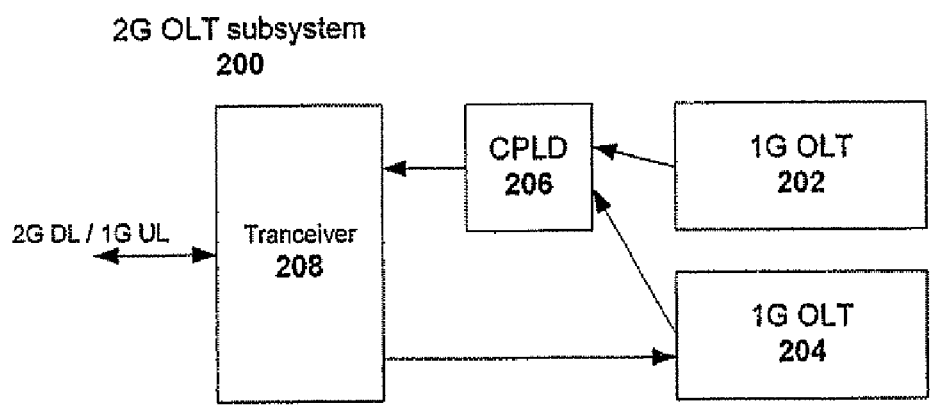
FIG. 2 shows a subsystem of two OLT 1G components, connected together to achieve a 2G link in an EPON of the present invention.
Figure 3:
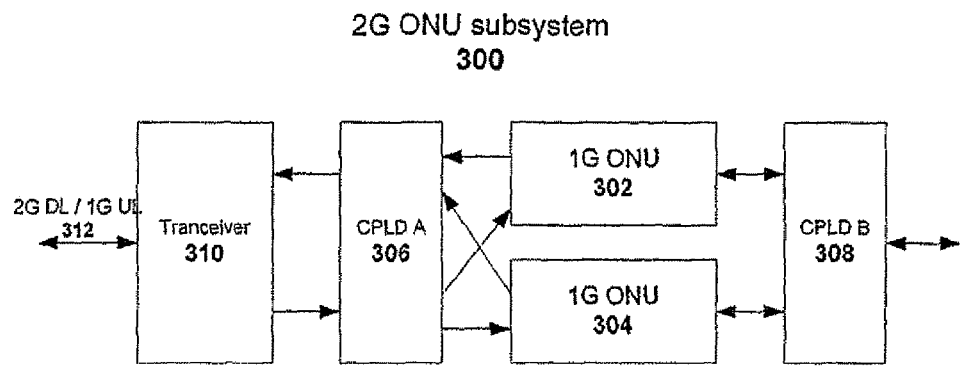
FIG. 3 shows a subsystem of two ONU 1G components, connected together to achieve a 2G link in an EPON of the present invention.
Figure 5A:
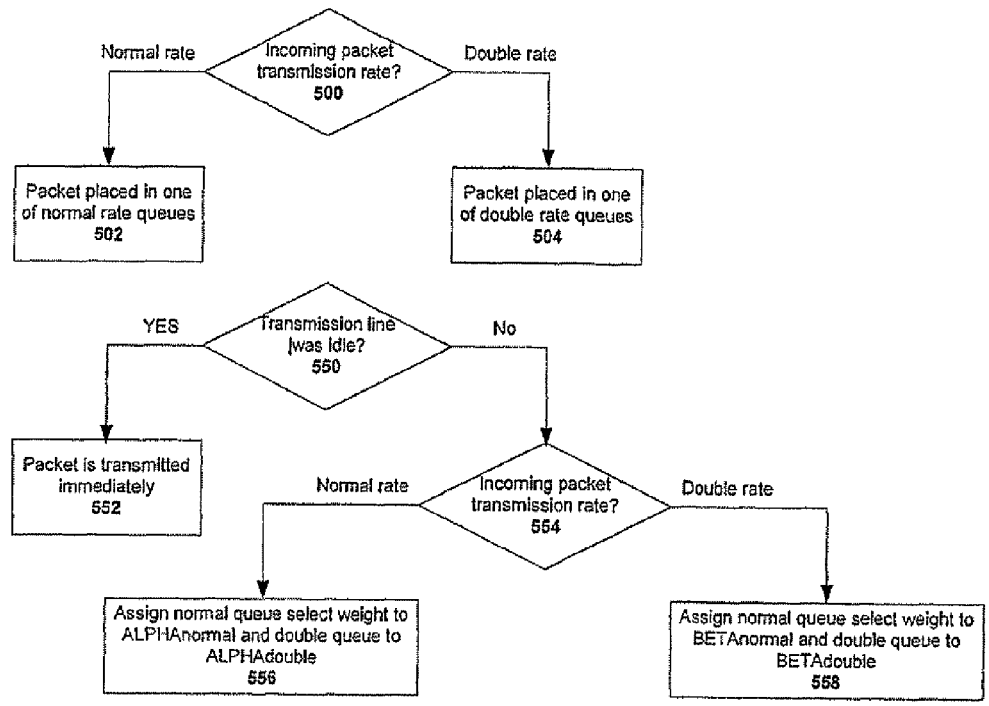
FIG. 5a shows a flow chart of a scheme to reorder packet transmission based on their transmission rate.
Figure 5B:
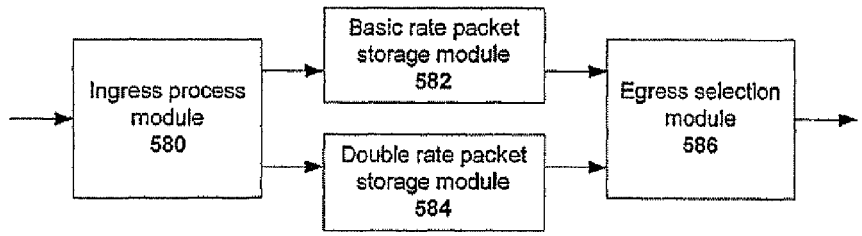
FIG. 5b shows schematically a subsystem in which the reordering process of FIG. 5a is carried out.

In a preferred embodiment, the inventive operability of a higher rate EPON according to the present invention is facilitated by the subsystems described in FIGS. 2, 3 and 5b.

FIG. 2 shows schematically a subsystem 200 of two 1G OLT devices functioning together to achieve a 2G link. Exemplarily, subsystem 200 may represent a logical 2G OLT of the present invention. Subsystem 200 comprises two 1G OLT devices 202 and 204, a complex programmable logic device (CPLD) 206 and a transceiver 208, interconnected as shown. The CPLD is operative to combine functionalities of two 1G devices. Subsystem 200 supports a 2G BW downlink transmission of a 2G OLT using legacy (standard) OLT 1G devices.

FIG. 3 shows schematically a subsystem 300 of two 1G ONU devices connected together to achieve a 2G link. Exemplarily, subsystem 300 may represent a 2G ONU of the present invention. Subsystem 300 comprises two 1G ONUs 302 and 304, two CPLDs (CPLD A 306 and CPLD B 308), a transceiver 310, and a respective bidirectional PON interface 312, all interconnected as shown. System 300 supports a 2G BW downlink transmission using legacy 1G ONU devices. Each of subsystems 200 and 300, separately or in combination, may be used to implement any of the method embodiments of the present invention.

The standard 8 B/10 B line code is a very popular code well known in the art, originating from the fiber channel and adopted by IEEE for the 802.3 standard. In a first embodiment of the method for bandwidth doubling in an EPON according to the present invention (not shown in the figures), the 8 B/10 B line code is used in the double-rate downlink of an EPON network. In other words, a 2G OLT of the present invention is configured to transmit at 2G using the 8 B/10 B line code.

In a second embodiment of the method for bandwidth doubling in an EPON according to the present invention, the method uses interleaving of two different 1G links, combined to a single 2G link, as shown in Table 1:

TABLE 1

| M0 | L0 | M1 | L1 | M2 | L2 | M3 | L3 | M4 | L4 | M5 | L5 | M6 | L6 | M7 | L7 |
|----|----|----|----|----|----|----|----|----|----|----|----|----|----|----|----|
| A0 |    |    | A1 |    | A2 |    | A3 |    | A4 |    | A5 |    | A6 |    | A7 |

Table 1 shows the OLT-transmitted bit order. The top line is the transmission bit order at the double rate. The bottom line is the transmission bit order at the basic rate. Every byte includes 8 bits 0-7. M0 is the least significant bit (LSB) in byte M. L0 and A0 are similarly LSBs of two other respective bytes L and A. Byte A is transmitted at the basic rate, and bytes M and L are transmitted during the same time at the double rate. Exemplarily, the transmission is performed using the two 1G OLTs in system 200 in FIG. 2. CPLD 206 is responsible for taking one bit from each 1G OLT device, and placing those one after the other on the speed-up link. M and L are always spaced two bytes apart, as shown in Table 2, which shows an arbitrary sequence of a 4-byte transmission (P and T are different bytes):

TABLE 2

| M | P | L | T |
|---|---|---|---|

The benefit of this embodiment of line code interleaving (i.e. the interleaving of the two links) is that it prevents comma reception (see IEEE802.3 clause 36) by a basic (1G) rate receiver. The probability of a false lock of the basic rate receiver with this scheme is similar to white noise lock probability. The comma of the double rate is used also for a comma locking mechanism of the basic rate.

Figure 4:
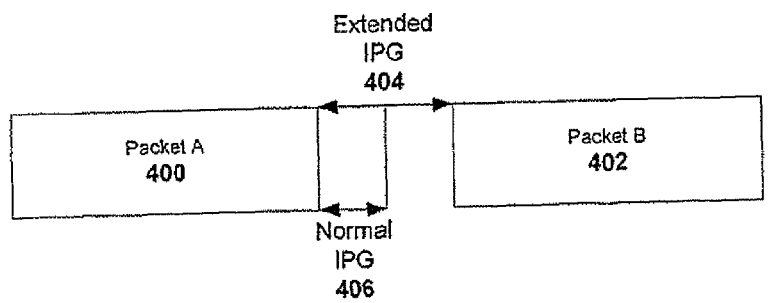
FIG. 4 shows an embodiment of packets spaced by double the inter-packet gap (IPG) in order to allow simultaneous comma synchronization in two rates.

In yet another embodiment of the method for bandwidth doubling in an EPON according to the present invention, shown in FIG. 4, the inter-packet gap (IPG) length in the double-rate transmission is doubled, to guarantee comma synchronization at the basic rate.

FIG. 4 shows an embodiment of packets in a transmission spaced by a double IPG length in order to allow simultaneous comma synchronization at two rates. The figure shows the transmission of two packets 400 and 402. An IPG 404 is doubled over a standard (normal) IPG 406, thereby achieving simultaneous comma synchronization between the 1G and 2G downlinks.

In yet another embodiment of the method for bandwidth doubling in an EPON according to the present invention, support for a mixed network in which 1G and 2G devices operate simultaneously is provided by defining windows of transmission. Each window's transmission occurs at a defined rate. To support this, the downlink transmission needs to include reordering, i.e. grouping of downlink packets of different rates to minimize the number of transitions between the two different rates. In reordering, the packet transmission order is not necessarily the packet arrival order to the OLT. Reordering also requires consideration of the rate of the destination device (ONU).

FIG. 5a shows schematically a reordering flow chart, and FIG. 5b show schematically a subsystem implementing the reordering. The flow chart is divided into two parts: an ingress process (steps 500-504), in which a packet enters a queue, and an egress process (steps 550-558), in which the packet leaves the queue. The ingress process in performed in an ingress process module 580, storage for packets to be transmitted at the basic rate is performed in a basic rate packet storage module 582, storage for packets to be transmitted at the fast rate is performed in a fast rate storage module 584, and egress selection is performed in an egress selection module 586. Modules 580-586 could exemplarily be implemented in a CPLD or in a dedicated 2G OLT. Exemplarily, modules 580-586 may be implemented in OLT 102 in FIG. 1.

In the ingress process, a comparison step 500 checks if the incoming packet should be transmitted at the normal or at the double rate. If at the normal rate, the packet is placed in a normal rate queue in step 502. If at the double rate, the packet is placed in a double rate queue in step 504.

The egress process is responsible for selecting a group of queues for transmission. A check in step 550 establishes if a packet is pending at either queue. If no packet was pending previously and the transmission line is idle, a newly pending packet is transmitted immediately in the downstream direction in step 552. Otherwise, the history of previous packet transmission plays a role in the selection of the next transmission. A check in step 554 establishes if a previously transmitted packet was transmitted at a normal or at a double rate. If at a normal rate, weights ($\alpha_{normal}$, $\alpha_{double}$) for selecting the queue groups are assigned in step 556. Typically, $\alpha_{normal} \gg \alpha_{double}$. Otherwise, if the previously transmitted packet was transmitted at the double rate, the weights ($\beta_{normal}$, $\beta_{double}$) for selecting the queue groups are assigned in step 558. Typically, $\beta_{normal} \gg \beta_{double}$.

The weights are used for the selection process as a mean to prefer one queue over the other. They represent an abstract mechanism for creating a preference. The selection occurs at the OLT. With this scheme, the basic rate receiver is not required to remain locked on the fast (double) rate clock. The beginning of the basic rate transmission will include a long IPG assisting locking of the basic rate receiver, described exemplarily in FIG. 4. When a packet from a queue is chosen for transmission, if the basic rate transceiver cannot lock on the double rate, then each fast rate transition will cause loss of synchronization. Therefore, some overhead is required for regaining synchronization before a transmission at the basic rate.

In yet another embodiment of the method for bandwidth doubling in an EPON according to the present invention, the entire 8 B/10 B code is removed from just the downlink transmission. In this case, the effective bandwidth is increased by 25% because of the removal of the line code overhead. In case of the double rate transmission, the rate will increase from 2G to 2.5G.

In yet another embodiment of the method for bandwidth doubling in an EPON according to the present invention, the method uses symbol-by-symbol multiplexing (SSM), in which in every time unit a symbol from a first channel is transmitted followed by a symbol from a second channel. The receiving side performs de-multiplexing. Each receiver receives the information simultaneously and instantaneously with the other receiver. Consequently, the utilization of existing channel transmitters and receivers is straightforward. The SSM enables reconstruction of the original packet transmission time and use of existing devices for interleaving two channels. The dual-rate operation supports a solution based on concatenation of 1G devices e.g. as shown in FIGS. 2 and 3. Table 3 shows an exemplary transmitted bit order using SSM. The same bit order as in Table 1 is used. M is the currently transmitted byte of channel A, and L is the currently transmitted byte of channel B.

TABLE 3

| M0 M1 M2 M3 M4 M5 M6 M7 L0 L1 L2 L3 L4 L5 L6 L7 |
| --- |

In yet another embodiment of the method for bandwidth doubling in an EPON according to the present invention, the rate is doubled through packet-by-packet multiplexing (PPM). PPM is based on taking packets from each channel on a round-robin basis. However, packets may have different lengths, and packet arrival timing needs to be maintained.

Figure 6:
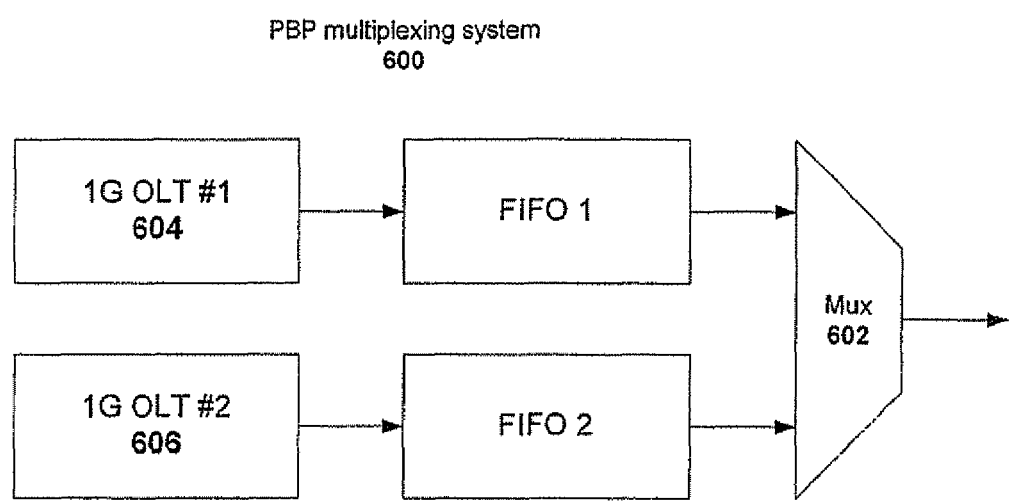
FIG. 6 shows schematically a basic packet-by-packet (PBP) multiplexing system.

FIG. 6 shows a basic PPM system 600 comprising two channels, 1 and 2, operative to send information packets from two 1G OLT devices 604 and 606 (exemplarily similar to OLT devices 202 and 204 in FIG. 2) through two first-in first-out (FIFO) buffers FIFO 1 and FIFO 2 into a multiplexer (MUX) 602. The multiplexer selects the FIFO for transmission based on the fullest FIFO (a FIFO check is done by the MUX), and outputs a 2G downstream traffic. The two FIFOs and the MUX may be exemplarily implemented in CPLD 206 in FIG. 2. An illustration of PPM is shown in FIG. 7.

Figure 7A:
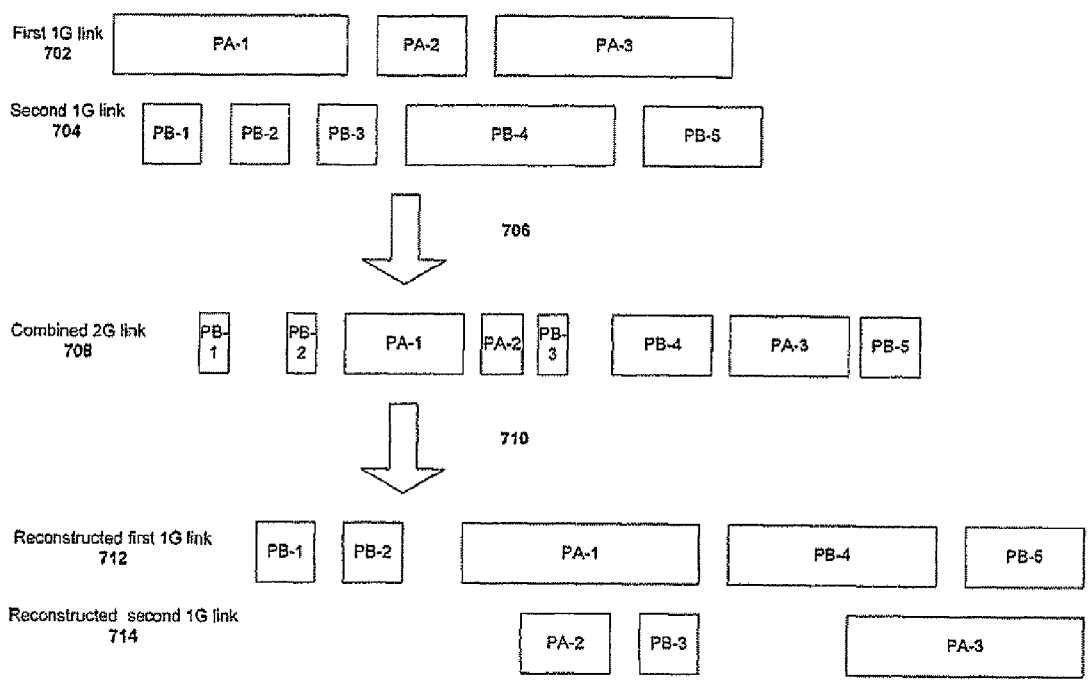
FIGS. 7a, b illustrate the process of PBP multiplexing: a) without time delay; b) with time delay

In FIG. 7a, a packet originated from a first 1G link 702 is marked as PA and a packet originated from a second 1G link 704 is marked as PB. The numbers attached to each PA or PB packet indicate the packet sequential number, i.e. its timing. A first arrow 706 converts the two streams of packets into a combined 2G stream 708. This may be done exemplarily by MUX 602 in FIG. 6. As seen, the original timing of a packet (indicated by the relative timing between packets) is modified, and consequently the channel timing property is ruined. A second arrow 710 reconstructs the 2G stream into two 1G streams 712 and 714. The reconstruction may be done exemplarily in CPLD 306 of FIG. 3. Note that while it is desired that the original packet order be preserved, in this example the reconstructed packet order is different than the original one. To solve this problem, i.e. in order to make the PPM preserve the original (1G) packet order, time information is added to each packet. The time information contains a "packet delay" between a first byte arrival from each original (1G) channel link (OLT devices 604 and 606 in FIG. 6) and the time the first byte leaves the speed-up (2G) channel at the MUX 602 output, in FIG. 6. Using this information, a receiving demultiplexer in CPLD 306 in FIG. 3 delays the transmission of each packet by the amount of (MAX delay-packet delay) from the time the packet was received in the original 2G channel (input to transceiver 310 in FIG. 3) to the time the packet leaves toward a specific channel (to ONUs 302 and 304 in FIG. 3). "MAX delay" is a constant, preferably set to be greater than the maximal packet length (MTU), i.e. MAX delay>packet MTU. The result, shown in FIG. 7b in reconstructed links 762 and 764, is to restore the original packet order. The maximal delay, i.e. the overall delay between packet arrival to the OLT until packet reception by an ONU is equal to the length of the two longest packets in the 1G channel, or of the four longest packets in the 2G channel. Exemplarily in FIGS. 7a,b, this refers to packets transmitted in channel 752 and packets reconstructed in channel 762.

Figures 7B, 8:
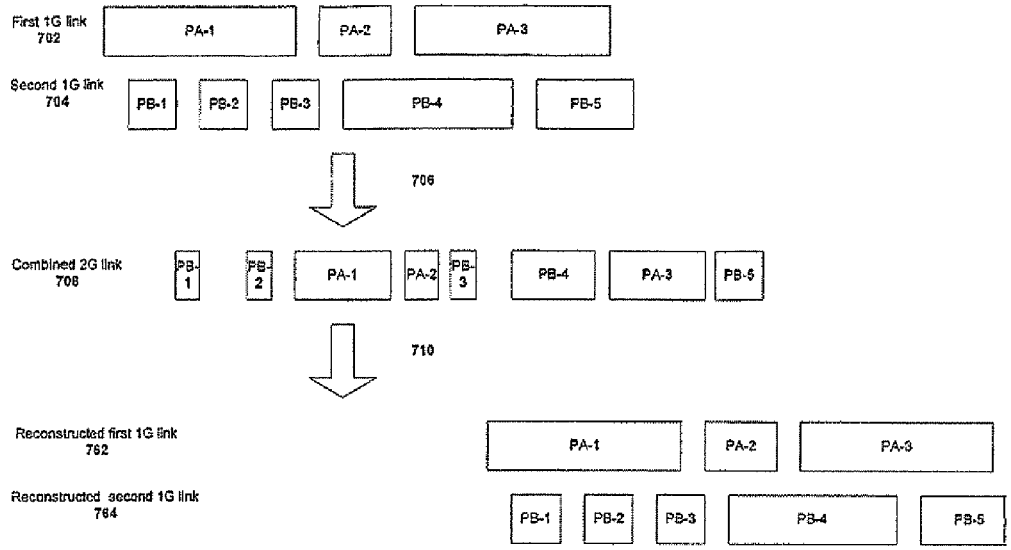
FIG. 8 shows an exemplary summary of two bytes placed in a packet preamble for error correction.

The time information is added as a side-band (side information) to each transmitted packet. For example, in Ethernet, 2 bytes in the 8 byte preamble of each packet can be used for this purpose. These values are ignored in a standard Ethernet receiver, and are overridden herein for a new purpose. These bytes will be returned to the original value (0x55) after the DEMUX will use the inserted time information An error correction function can optionally be placed in the preamble to assist the operation. Preferably, a single bit is corrected. An exemplary summary of 2 bytes placed in the preamble is shown in FIG. 8.

The broadcast behavior of a mixed 2G EPON is described next. Broadcast/multicast is easily supported in a unified network, in which all devices are configured to work at a single rate. In a unified network, a packet is transmitted only once, in contrast with a mixed (dual-rate) network, where the packet must be transmitted twice, once at each rate. A discovery protocol can be configured to be performed only at the normal rate.

In such a unified network, the rate of downlink transmission from an OLT to each ONU can be increased or decreased by negotiation. Both the ONU and OLT must agree on the used rate. Negotiation can begin by either the ONU or the OLT as an initiator. Upon acknowledgement from the ONU (regardless of the initiator), the OLT starts to use the new downlink rate. Upon acknowledgement from the OLT (regardless of the initiator), the ONU starts to use the new uplink rate.

With respect to the handling of the clock rate in each of the embodiments of the method for bandwidth doubling in an EPON according to the present invention, the clock rate can be detected by attempting to lock the clock and data recovery (CDR) on the highest rate clock. If the comma is not locked, the CDR is shifted to a lower rate. In other words, this is a method with two phases. The first phase is initialization. The receiver tries to lock on one frequency. If it fails it, moves to the second phase, where the receiver attempts to lock on the other frequency. Following failure, this process repeats itself by returning to the first phase until lock is achieved. To maximize resemblance to basic 1G EPON and since uplink transmission is not modified, the basic time unit of MPCP, called Time Quanta, or TQ, is also not modified.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A system for effecting bandwidth doubling in an Ethernet passive optical network (EPON) that comprises a logical optical line terminal (OLT) optically coupled to a plurality of optical network units (ONUs), the system comprising a mechanism, for doubling the downlink transmission rate; from the OLT to at least one ONU configured to receive double rate transmissions, by symbol-by-symbol multiplexing of line code symbols, wherein said downlink transmission rate is a physical bit transmission rate.

2. The system of claim 1, wherein the mechanism for doubling the downlink transmission rate from the OLT to at least one ONU comprises a subsystem comprising two single rate OLT devices functionally connected through a programmable logic device to provide a double rate transmission functionality to the logical OLT.

3. The system of claim 2, wherein the single rate is a 1Gigabit per second (1G) rate and wherein the double rate is a 2G rate.

4. The system of claim 3, wherein the at least one ONU configured to receive double rate transmissions is a 2G ONU that comprises two 1G ONU devices functionally connected to receive 2G downlink transmissions.

5. The system of claim 2, wherein said double rate transmission functionality includes symbol-by-symbol multiplexing.

6. The system of claim 1, wherein said programmable logic device is a complex programmable logic device.

7. The system of claim 1, wherein said line code symbols include 8 B/10 B line code symbols.

8. A method for bandwidth doubling in an Ethernet passive optical network (EPON) comprising the steps of:
 a. providing a mixed system in which a logical optical line terminal (OLT) is optically coupled to at least one single rate optical network unit (ONU) and to at least one double rate ONU that is operative to perform combined single rate and double rate operations, wherein the OLT is operative to transmit downstream packets through a downlink to each ONU, wherein each ONU is operative to transmit upstream packets through an uplink to the OLT, and wherein the logical OLT is a double rate OLT that comprises a functional combination of two single rate OLT devices and is operative to transmit to each double rate ONU at a double rate; and
 b. enabling the OLT to transmit to each ONU at a downstream rate that matches the respective ONU rate;
 wherein the step of enabling the double rate OLT to transmit to each double rate ONU at a double rate includes symbol-by-symbol multiplexing of line code symbols; and wherein said rates are physical bit transmission rates.

9. The method of claim 8, wherein said line code symbols include 8 B/10 B line code symbols.

* * * * *